(12) United States Patent
Kogure et al.

(10) Patent No.: US 12,275,358 B2
(45) Date of Patent: Apr. 15, 2025

(54) WIRE HARNESS

(71) Applicant: Yazaki Corporation, Tokyo (JP)

(72) Inventors: Naoto Kogure, Shizuoka (JP); Hikaru Sano, Shizuoka (JP); Seiichi Sumiya, Kariya (JP)

(73) Assignee: YAZAKI CORPORATION, Tokyo (JP)

( * ) Notice: Subject to any disclaimer, the term of this patent is extended or adjusted under 35 U.S.C. 154(b) by 229 days.

(21) Appl. No.: 18/174,884

(22) Filed: Feb. 27, 2023

(65) Prior Publication Data

US 2023/0271573 A1 Aug. 31, 2023

(30) Foreign Application Priority Data

Feb. 28, 2022 (JP) ................................. 2022-028844

(51) Int. Cl.
| | |
|---|---|
| B60R 16/02 | (2006.01) |
| B60J 5/06 | (2006.01) |
| B60R 16/027 | (2006.01) |
| H02G 3/04 | (2006.01) |
| H02G 3/22 | (2006.01) |
| H02G 11/00 | (2006.01) |

(52) U.S. Cl.
CPC ............ *B60R 16/0215* (2013.01); *B60J 5/06* (2013.01); *H02G 3/0437* (2013.01); *H02G 3/22* (2013.01)

(58) Field of Classification Search
CPC ........ H02G 3/0437; H02G 3/22; H02G 11/00; B60R 16/0215; B60R 16/02; B60R 16/0207; B60R 16/027
See application file for complete search history.

(56) References Cited

U.S. PATENT DOCUMENTS

| | | | |
|---|---|---|---|
| 7,980,518 B2 * | 7/2011 | Katou | ................. B60R 16/0215 248/51 |
| 11,247,619 B2 | 2/2022 | Yamashita et al. | |
| 2006/0254797 A1 * | 11/2006 | Charara | ................. H02G 11/00 174/72 A |

FOREIGN PATENT DOCUMENTS

| | | |
|---|---|---|
| JP | 10-175483 A | 6/1998 |
| JP | 2001-301545 A | 10/2001 |
| JP | 2008-5589 A | 1/2008 |
| JP | 2021-019386 A | 2/2021 |

* cited by examiner

*Primary Examiner* — Hoa C Nguyen
*Assistant Examiner* — Amol H Patel
(74) *Attorney, Agent, or Firm* — Sughrue Mion, PLLC

(57) ABSTRACT

Provided is a harness body that is a wiring component that electrically connects a first electrical connection target installed on a slide door and a second electrical connection target installed on a vehicle body, and is wired along a link mechanism that couples the slide door and the vehicle body and reciprocates the slide door in a sliding direction with respect to the vehicle body; and a harness temporary holding structure at least at one position capable of temporarily holding the harness body assembled to the link mechanism before the link mechanism is assembled to the slide door and the vehicle body.

6 Claims, 5 Drawing Sheets

WIRE HARNESS

CROSS-REFERENCE TO RELATED APPLICATION(S)

The present application claims priority to and incorporates by reference the entire contents of Japanese Patent Application No. 2022-028844 filed in Japan on Feb. 28, 2022.

BACKGROUND OF THE INVENTION

1. Field of the Invention

The present invention relates to a wire harness.

2. Description of the Related Art

Conventionally, a vehicle such as an automobile is mounted with a wire harness that electrically connects a power source (secondary battery or the like) on a vehicle body side, an electrical component, and the like to a switch on a slide door side, an electrical component, and the like. This type of wire harness is disclosed in, for example, Japanese Patent Application Laid-open No. 2021-19386 below.

In the conventional slide door, the slide mechanism responsible for the sliding operation is assembled between the slide door and the vehicle body. However, a wire harness for the slide door is transferred between the vehicle body and the slide door in another process different from the assembling process of the slide mechanism. Therefore, in the conventional slide door, there is room for improving the assembling workability of the wire harness.

SUMMARY OF THE INVENTION

Therefore, an object of the present invention is to provide a wire harness for a slide door excellent in assembling workability.

In order to achieve the above mentioned object, a wire harness according to one aspect of the present invention includes a harness body that is a wiring component that electrically connects a first electrical connection target installed on a slide door and a second electrical connection target installed on a vehicle body, and is wired along a link mechanism that couples the slide door and the vehicle body and reciprocates the slide door in a sliding direction with respect to the vehicle body; and a harness temporary holding structure at least at one position, capable of temporarily holding the harness body assembled to the link mechanism before the link mechanism is assembled to the slide door and the vehicle body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
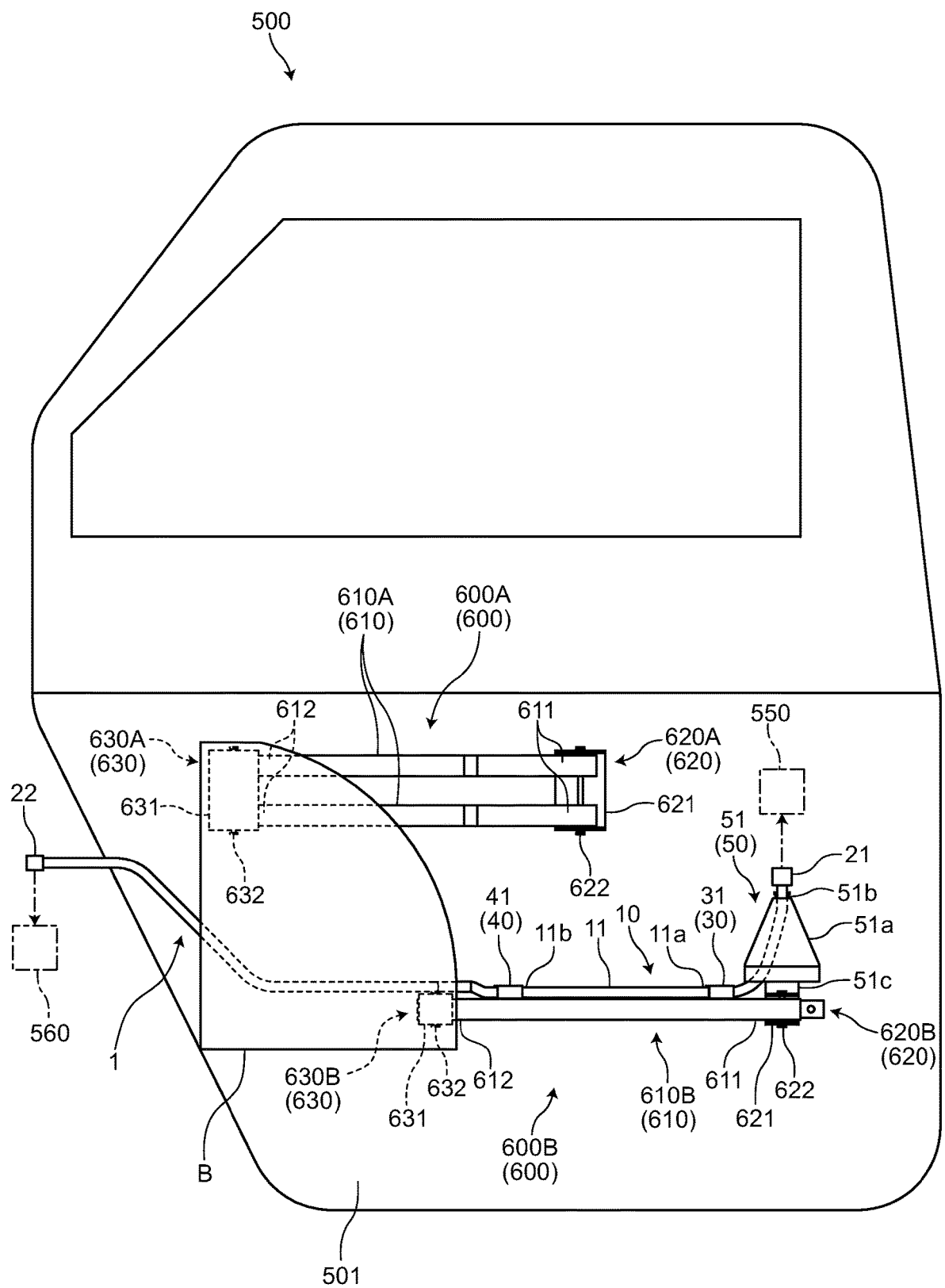
FIG. 1 is a plan view of a wire harness of an embodiment as viewed from a vehicle interior side.

Hereinafter, an embodiment of a wire harness according to the present invention will be described in detail with reference to the drawings. Note that the present invention is not limited by the embodiment.

EMBODIMENT

An embodiment of the wire harness according to the present invention will be described with reference to FIGS. 1 to 5.

Reference numeral 1 in FIGS. 1 to 5 denotes a wire harness of the present embodiment.

Figure 2:
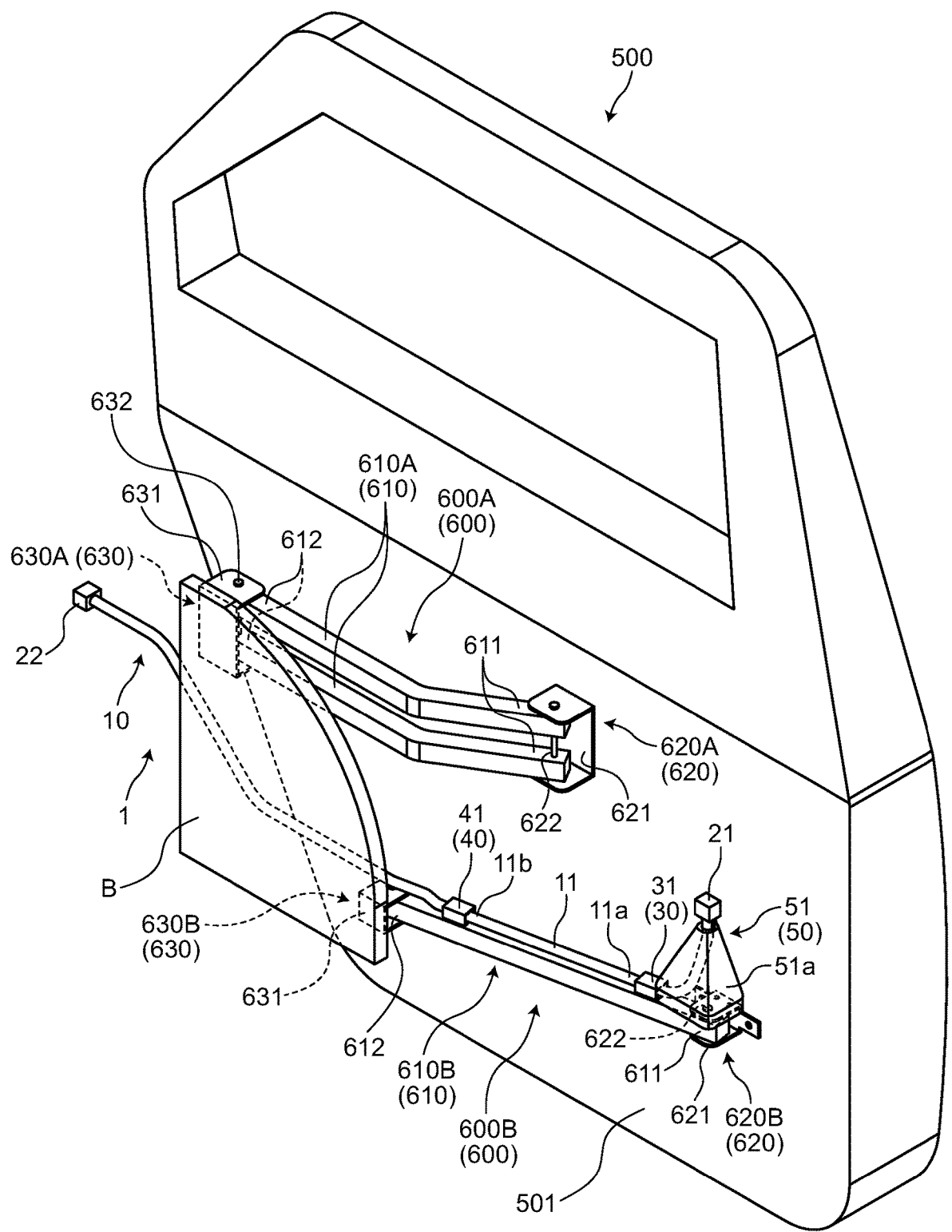
FIG. 2 is a perspective view of the wire harness of the embodiment as viewed from a vehicle interior side.
Figure 3:
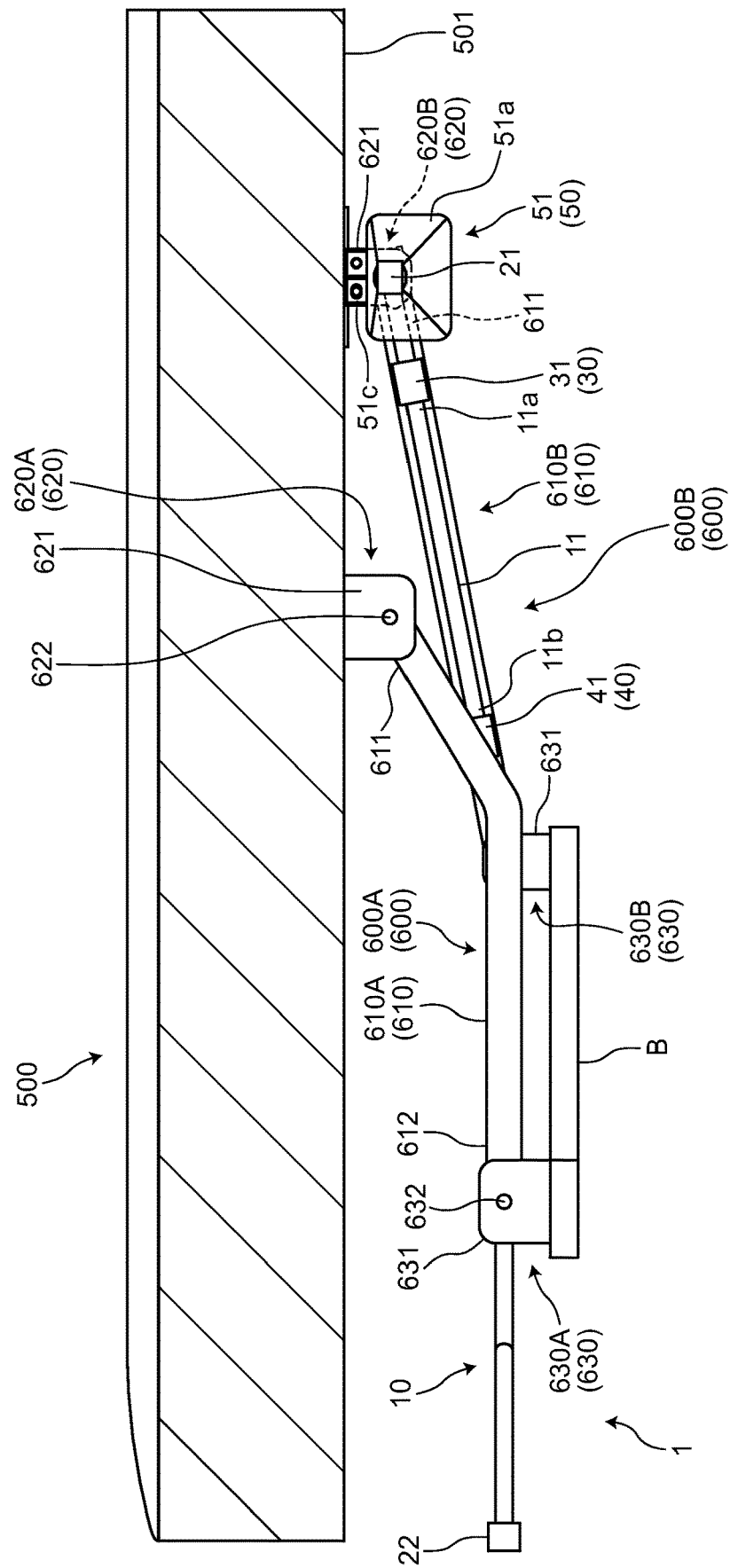
FIG. 3 is a plan view of the wire harness of the embodiment as viewed from above the vehicle.

For example, in a vehicle such as an automobile, there is a vehicle on which a slide door 500 (FIGS. 1 to 3) capable of reciprocating in a sliding direction with respect to a vehicle body B is mounted. The vehicle includes a link mechanism 600 that couples the slide door 500 and the vehicle body B and reciprocates the slide door 500 in the sliding direction with respect to the vehicle body B in order to take charge of the sliding operation (reciprocating operation in the sliding direction) of the slide door 500 (FIGS. 1 to 3). The link mechanism 600 illustrated here slides the slide door 500 on the vehicle side in the vehicle front-rear direction.

The link mechanism 600 is transferred between the slide door 500 and the vehicle body B to displace the slide door 500 with respect to the vehicle body B between the fully open position and the fully closed position. The link mechanism 600 includes an arm member 610, a first bearing 620 fixed to the slide door 500 and pivotally supporting one end 611 of the arm member 610, and a second bearing 630 fixed to the vehicle body B side and pivotally supporting an other end 612 of the arm member 610 (FIGS. 1 to 3). That is, the arm member 610 has a turning fulcrum (hereinafter, referred to as a "door-side turning fulcrum") on the slide door 500 side in the link mechanism 600 at the one end 611, and has a turning fulcrum (hereinafter, referred to as a "vehicle-body-side turning fulcrum") on the vehicle body B side in the link mechanism 600 at the other end 612.

The first bearing 620 includes a bracket 621 fixed to, for example, an inner panel 501 of the slide door 500, and both ends of a rotating shaft 622 are rotatably supported by the bracket 621 (FIGS. 1 to 4). The rotating shaft 622 is installed with its axial direction aligned with the vehicle vertical direction. The one end 611 of the arm member 610 is fixed to the rotating shaft 622, and is pivotally supported rotatably around the axis of the rotating shaft 622 with respect to the bracket 621 via the rotating shaft 622. In addition, the second bearing 630 includes a bracket 631 fixed to the vehicle body B, and both ends of a rotating shaft 632 are rotatably supported by the bracket 631 (FIGS. 1 to 3). The other end 612 of the arm member 610 is fixed to the rotating shaft 632, and is pivotally supported rotatably around the axis of the rotating shaft 632 with respect to the bracket 631 via the rotating shaft 632.

The link mechanism 600 reciprocates the slide door 500 in the sliding direction with respect to the vehicle body B while rotating the arm member 610 at the door-side turning fulcrum of the one end 611 and the vehicle-body-side turning fulcrum of the other end 612 by, for example, transmitting an output torque of a rotary machine (not illustrated) as a drive source to the rotating shaft 632 on the vehicle body B side. In the link mechanism 600, for example, the arm member 610 is arranged in a state of extending in the sliding direction (here, the vehicle front-rear direction) of the slide door 500 when the slide door 500 is at the fully closed position (FIGS. 1 to 3), and the arm member 610 is arranged in a state of extending in the intersecting direction (for example, the vehicle width direction) with respect to the sliding direction of the slide door 500 when the slide door 500 is at the fully open position.

A plurality of link mechanisms 600 are provided between the slide door 500 and the vehicle body B. The plurality of link mechanisms 600 are arranged at intervals in the vehicle vertical direction. Here, as the link mechanism 600, an upper link mechanism 600A on the vehicle upper side and a lower link mechanism 600B on the vehicle lower side are provided (FIGS. 1 to 3). The upper link mechanism 600A includes two arm members 610A, a first bearing 620A (bracket 621) that pivotally supports the one end 611 of each of the two arm members 610A via one rotating shaft 622, and a second bearing 630A (bracket 631) that pivotally supports the other end 612 of each of the two arm members 610A via one rotating shaft 632 (FIGS. 1 to 3). The lower link mechanism 600B includes one arm member 610B, a first bearing 620B (bracket 621) that pivotally supports the one end 611 of the arm member 610B via the rotating shaft 622, and a second bearing 630B (bracket 631) that pivotally supports the other end 612 of the arm member 610B via the rotating shaft 632 (FIGS. 1 to 3). Additionally, the drive source is connected to any one of the upper link mechanism 600A and the lower link mechanism 600B.

The wire harness 1 of the present embodiment is mounted on a vehicle in order to electrically connect a first electrical connection target 550 installed on the slide door 500 and a second electrical connection target 560 installed on the vehicle body B (FIG. 1).

The first electrical connection target 550 is installed on the slide door 500 such as an electrical component or a switch. For example, the electrical components of the slide door 500 indicate a drive device that drives a power window, a speaker, and the like. The switch of the slide door 500 indicates a switch for operating a power window, a switch for operating a power seat, and the like. On the other hand, the second electrical connection target 560 is installed on the vehicle body B side such as a power source (secondary battery or the like) or an electrical component. For example, the electric component on the vehicle body B side indicates an acoustic device related to a speaker of the slide door 500, a drive device for driving a power seat, and the like.

The wire harness 1 includes a harness body 10 as a wiring component that electrically connects the first electrical connection target 550 and the second electrical connection target 560 (FIGS. 1 to 3). The harness body 10 may be formed of only an electric wire bundle obtained by bundling a plurality of electric wires, the entire electric wire bundle may be covered with an exterior component such as a corrugated tube, or the electric wire bundle may be partially covered with one or a plurality of exterior components.

In the wire harness 1, one terminal of the harness body 10 is electrically connected directly or indirectly to the first electrical connection target 550, and the other terminal of the harness body 10 is electrically connected directly or indirectly to the second electrical connection target 560. The wire harness 1 illustrated here includes a first connector 21 that is assembled to one terminal of the harness body 10 and electrically connects the harness body 10 to the first electrical connection target 550 directly or indirectly, and a second connector 22 that is assembled to the other terminal of the harness body 10 and electrically connects the harness body 10 to the second electrical connection target 560 directly or indirectly (FIGS. 1 to 3).

The harness body 10 is wired along the link mechanism 600. Then, the harness body 10 is held by the link mechanism 600. The harness body 10 is temporarily held in advance with respect to the link mechanism 600 before being assembled to the slide door 500 and the vehicle body B. Then, the wire harness 1 includes a harness temporary holding structure 30, at least at one position, capable of temporarily holding the harness body 10 by the link mechanism 600 before the link mechanism 600 is assembled to the slide door 500 and the vehicle body B (FIGS. 1 to 5). Therefore, in the wire harness 1, when the link mechanism 600 is assembled to the slide door 500 and the vehicle body B, the harness body 10 can be assembled to the slide door 500 and the vehicle body B in the same process as the link mechanism 600.

Here, the harness temporary holding structure 30 is configured to adopt, for example, a temporary holding mode in which a relative displacement between the harness body 10 and the link mechanism 600 at the temporary holding position is allowed. In this case, after the link mechanism 600 is assembled to the slide door 500 and the vehicle body B, the harness temporary holding structure 30 can adjust the relative position of the harness body 10 with respect to the link mechanism 600 in accordance with, for example, the connection position of the first connector 21 and the second connector 22.

For example, the harness temporary holding structure 30 is configured to allow relative displacement between the harness body 10 and the link mechanism 600 at the temporary holding position not only before the link mechanism 600 is assembled to the slide door 500 and the vehicle body B but also after the link mechanism 600 is assembled to the slide door 500 and the vehicle body B. That is, the harness temporary holding structure 30 is provided only for temporarily holding the harness body 10 with respect to the link mechanism 600, and even after the assembly of the harness body 10 with respect to the slide door 500 and the vehicle body B is completed, the relative displacement may remain allowed between the harness body 10 and the link mechanism 600. However, in order to improve the sound vibration performance during traveling of the vehicle, it is preferable to suppress the relative displacement between the harness body 10 and the link mechanism 600. Therefore, in the wire harness 1, when the improvement of the sound vibration performance is desired using such a harness temporary holding structure 30, it is desirable to provide at least one harness fixing structure 40 to be described later at a position different from the position of the harness temporary holding structure 30.

On the other hand, the harness temporary holding structure 30 may be configured such that the relative displacement is allowed between the harness body 10 and the link mechanism 600 at the temporary holding position until the link mechanism 600 is assembled to the slide door 500 and the vehicle body B, and the relative displacement is not generated between the harness body 10 and the link mechanism 600 at the temporary holding position of the postassembly. That is, the harness temporary holding structure 30 may allow the relative displacement between the harness body 10 and the link mechanism 600 at the temporary holding position at least until the link mechanism 600 is assembled to the slide door 500 and the vehicle body B, and fix the harness body 10 without the relative displacement with respect to the link mechanism 600 after the link mechanism 600 is assembled to the slide door 500 and the vehicle body B. Therefore, the harness temporary holding structure 30 is used as a fixing structure for fixing the harness body 10 to the link mechanism 600 after the link mechanism 600 is assembled to the slide door 500 and the vehicle body B.

In addition, the harness temporary holding structure 30 may be configured to adopt, for example, a temporary holding mode in which a relative displacement between the harness body 10 and the link mechanism 600 at the temporary holding position is not allowed. That is, the harness temporary holding structure 30 is to fix the harness body 10 to the link mechanism 600 without relative displacement before the link mechanism 600 is assembled to the slide door 500 and the vehicle body B. The harness temporary holding structure 30 is used as a fixing structure for fixing the harness body 10 to the link mechanism 600 after the link mechanism 600 is assembled to the slide door 500 and the vehicle body B.

In the wire harness 1 illustrated here, the harness body 10 is fixed to the link mechanism 600 in a state after the completion of the assembly of the slide door 500 and the vehicle body B completed.

For fixing the harness body 10, for example, the harness temporary holding structure 30 that can also be used as the fixing structure described above may be used, or the harness fixing structure 40 that fixes the harness body 10 to the link mechanism 600 at a position different from the temporary holding position by the harness temporary holding structure 30 may be used (FIGS. 1 to 3).

For example, in the wire harness 1, after completion of the assembly of the harness body 10 with respect to the slide door 500, the vehicle body B, and the link mechanism 600, in a case where the harness body 10 after the completion of the assembly is fixed at one position so as not to be displaced relative to the link mechanism 600, the harness temporary holding structure 30 that can also be used as the fixing structure described above is provided at one position, and the harness body 10 is fixed so as not to be displaced relative to the link mechanism 600 using the harness temporary holding structure 30 at the one position.

In addition, in the wire harness 1, after completion of the assembly of the harness body 10 with respect to the slide door 500, the vehicle body B, and the link mechanism 600, in a case where the harness body 10 is fixed at one position so as not to be displaced relative to the link mechanism 600, the harness temporary holding structure 30 in which the relative displacement remains allowed between the harness body 10 and the link mechanism 600 even after the completion of the assembly of the harness body 10 with respect to the slide door 500 and the vehicle body B may be provided at least at one position, and the harness fixing structure 40 for fixing the harness body 10 to the link mechanism 600 at a position different from the temporary holding position of the harness temporary holding structure 30 may be provided at one position.

On the other hand, in the wire harness 1, after completion of the assembly of the harness body 10 with respect to the slide door 500, the vehicle body B, and the link mechanism 600, in a case where the harness body 10 after the completion of the assembly is fixed at a plurality of positions so as not to be displaced relative to the link mechanism 600, the harness temporary holding structure 30 that can also be used as the fixing structure described above is provided at a plurality of positions, and the harness body 10 is fixed so as not to be displaced relative to the link mechanism 600 using the harness temporary holding structure 30 at the plurality of positions.

In addition, in the wire harness 1, after completion of the assembly of the harness body 10 with respect to the slide door 500, the vehicle body B, and the link mechanism 600, in a case where the harness body 10 after the completion of the assembly is fixed at a plurality of positions so as not to be displaced relative to the link mechanism 600, the harness temporary holding structure 30 that can also be used as a fixing structure described above may be provided at least at one position, and the harness fixing structure 40 for fixing the harness body 10 to the link mechanism 600 at a position different from the temporary holding position of the harness temporary holding structure 30 may be provided at least at one position.

In addition, in the wire harness 1, after completion of the assembly of the harness body 10 with respect to the slide door 500, the vehicle body B, and the link mechanism 600, in a case where the harness body 10 after the completion of the assembly is fixed at a plurality of positions so as not to be displaced relative to the link mechanism 600, the harness temporary holding structure 30 in which the relative displacement remains allowed between the harness body 10 and the link mechanism 600 even after the completion of the assembly of the harness body 10 with respect to the slide door 500 and the vehicle body B may be provided at least at one position, and the harness fixing structure 40 for fixing the harness body 10 to the link mechanism 600 at a position different from the temporary holding position of the harness temporary holding structure 30 may be provided at a plurality of positions.

Here, the harness temporary holding structure 30 that can also be used as the fixing structure described above and the harness fixing structure 40 are used in combination. For example, the harness temporary holding structure 30 includes a fixture 31 for fixing the harness body 10 to the link mechanism 600 at a position to be temporarily held (FIGS. 1 to 5). Then, the harness fixing structure 40 includes a fixture 41 for fixing the harness body 10 to the link mechanism 600 at a position to be fixed (FIGS. 1 to 3). The fixtures 31 and 41 are, for example, clamps or clips provided with respective holding shapes with respect to the harness body 10 and the link mechanism 600 (for example, a portion formed in a flat plate shape), resin tapes that wind the harness body 10 and the link mechanism 600 together, and the like.

The harness temporary holding structure 30 and the harness fixing structure 40 may fix the harness body 10 to the bracket 621, 631 of the link mechanism 600 using the fixtures 31 and 41, or may fix the harness body 10 to the arm member 610 of the link mechanism 600 using the fixtures 31 and 41.

Specifically, the harness body 10 illustrated here includes a route regulating unit 11 which is wired along the link mechanism 600 and held by the link mechanism 600 (FIGS. 1 to 3). The route regulating unit 11 is a part that keeps the wiring route of the harness body 10 at a constant position with respect to the link mechanism 600 regardless of the sliding position of the slide door 500. In the route regulating unit 11, at least one end 11a is temporarily held by the link mechanism 600 by the harness temporary holding structure 30, and at least the other end 11b is fixed to the link mechanism 600 by the harness fixing structure 40.

The route regulating unit 11 illustrated here is wired along the arm member 610 and fixed to the arm member 610 by the harness temporary holding structure 30 at one position and the harness fixing structure 40 at one position (FIGS. 1 to 3). The harness temporary holding structure 30 is to adopt a fixing mode in which relative displacement is not generated between the route regulating unit 11 and the arm member 610 at the temporary holding position from the time of the temporary holding state. The harness fixing structure 40 is to fix the route regulating unit 11 to the arm member 610 at a position different from the temporary holding position.

For example, in the harness body 10, when a portion is wired along the arm member 610 between the one end 611 and the other end 612 of the arm member 610, the portion wired between the one end 611 and the other end 612 is the route regulating unit 11 (FIGS. 1 to 3). In this case, in the harness body 10, before the link mechanism 600 is assembled to the slide door 500 and the vehicle body B, for example, the one end 11a of the route regulating unit 11 is temporarily held in a fixed state with the one end 611 of the arm member 610 by the harness temporary holding structure 30. Then, in the harness body 10, after the link mechanism 600 is assembled to the slide door 500 and the vehicle body B, the other end 11b of the route regulating unit 11 is fixed to the other end 612 of the arm member 610 by the harness fixing structure 40.

As described above, in the wire harness 1 according to the present embodiment, a harness body 10 is temporarily held by a link mechanism 600 by a harness temporary holding structure 30 before the link mechanism 600 is assembled to a slide door 500 and a vehicle body B, so that the harness body 10 can be assembled to the slide door 500 and the vehicle body B together with the link mechanism 600. For example, in the wire harness 1, after the link mechanism 600 is assembled to the slide door 500 and the vehicle body B, the first connector 21 of the harness body 10 temporarily held by the link mechanism 600 is electrically connected to the first electrical connection target 550 side, and the second connector 22 of the harness body 10 is electrically connected to the second electrical connection target 560 side. At this time, in the wire harness 1, when the harness fixing structure 40 is used in combination as in the above specific example, the harness body 10 is fixed to the link mechanism 600 by the harness fixing structure 40. As described above, in the wire harness 1, the harness body 10 can be assembled to the slide door 500 and the vehicle body B in the same process as the process of assembling the link mechanism 600 to the slide door 500 and the vehicle body B. Therefore, the wire harness 1 can improve the assembling workability of the harness body 10.

One harness body 10 is provided as a pair with one link mechanism 600. When there are a plurality of link mechanisms 600, the wire harness 1 includes the harness body 10 wired in pairs with at least one of the plurality of link mechanisms 600 (here, the upper link mechanism 600A and the lower link mechanism 600B). For example, the wire harness 1 may include the harness body 10 to be wired and fixed only to the upper link mechanism 600A, may include the harness body 10 to be wired and fixed only to the lower link mechanism 600B, or may include the harness body 10 to be wired and fixed to the upper link mechanism 600A and the harness body 10 to be wired and fixed to the lower link mechanism 600B. The wire harness 1 illustrated here includes a harness body 10 to be wired and fixed only to the lower link mechanism 600B (FIGS. 1 to 3).

Furthermore, in addition to the first harness fixing structure 40 as the harness fixing structure 40, the wire harness 1 of the present embodiment may include a second harness fixing structure 50 at least at one position for fixing the harness body 10 to the slide door 500 side (FIGS. 1 to 5). The second harness fixing structure 50 includes a fixture 51 that fixes the harness body 10 on the slide door 500 side between the route regulating unit 11 and the first connector 21. The fixture 51 may be directly fixed to the slide door 500, or may be fixed to another member fixed to the slide door 500 and indirectly fixed to the slide door 500.

Here, the fixture 51 is fixed to the bracket 621 of the link mechanism 600 (lower link mechanism 600B) fixed to the slide door 500. For example, in the harness body 10, after the route regulating unit 11 is wired along the arm member 610 (arm member 610B) to the one end 611 of the arm member 610, one terminal side (first connector 21 side) is guided toward the first electrical connection target 550 side above the vehicle. The fixture 51 illustrated here is also used as a guide for guiding the harness body 10 toward the first electrical connection target 550 at the one end 611 of the arm member 610.

The fixture 51 includes a main body 51a formed in a truncated cylindrical shape tapered from the one end 611 of the arm member 610 toward the first electrical connection target 550 (FIGS. 1 to 5). The fixture 51 illustrated here is disposed such that the main body 51a is tapered toward the upper side of the vehicle. The main body 51a guides the harness body 10 from the one end 611 of the arm member 610 toward the first electrical connection target 550 by passing the harness body 10 therethrough.

Figure 4:
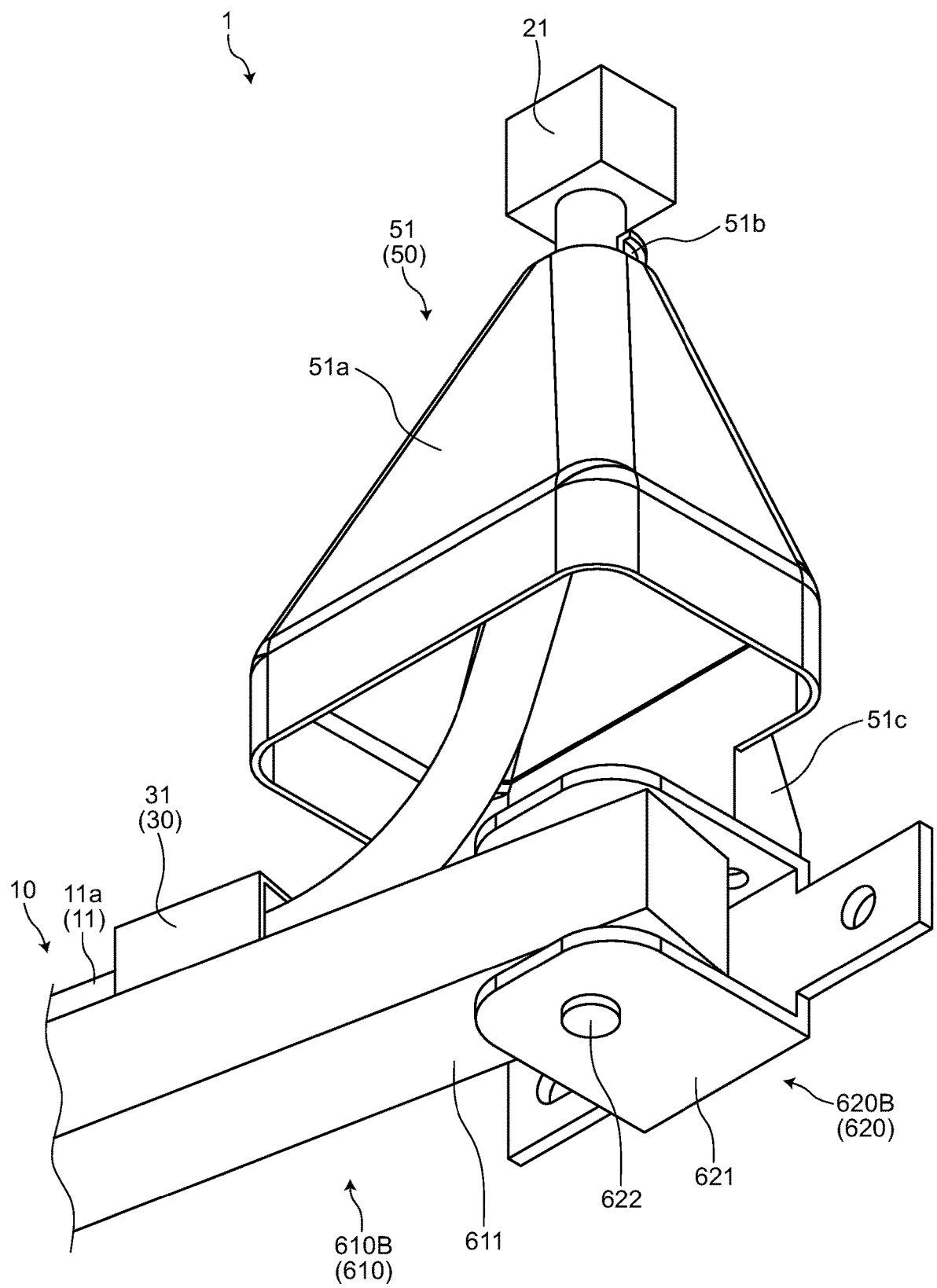
FIG. 4 is a perspective view illustrating a harness temporary holding structure and a second harness fixing structure.
Figure 5:
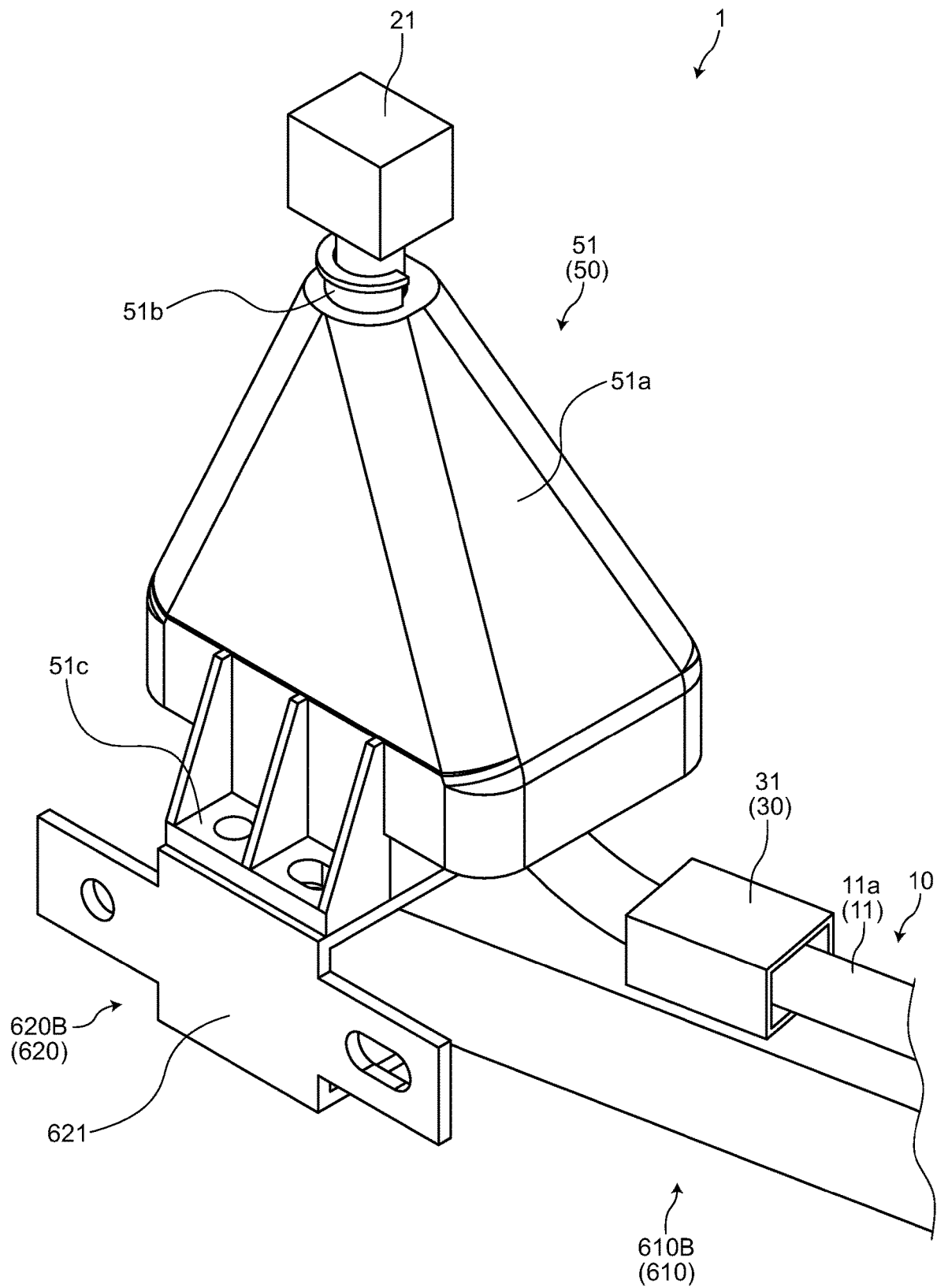
FIG. 5 is a perspective view of the harness temporary holding structure and the second harness fixing structure as viewed from different angles.

In addition, the fixture 51 has a semi-cylindrical holder 51b formed at the tip on the upper bottom side of the main body 51a so as to have the same size as the outer diameter of the harness body 10 (FIGS. 1, 4, and 5). The holder 51b holds the harness body 10 fitted in itself.

In addition, in the fixture 51, a fixing unit 51c for fixing to the bracket 621 is provided in a protruding state on the lower bottom side of the main body 51a (FIGS. 1, 3, 4, and 5). For example, the fixing unit 51c is screwed and fixed to the bracket 621.

Furthermore, the wire harness 1 of the present embodiment may include a third harness fixing structure (not illustrated) at least at one position that fixes the harness body 10 to the vehicle body B side. The third harness fixing structure includes a fixture that fixes the harness body 10 to the vehicle body B between the route regulating unit 11 and the second connector 22. The fixture is a clamp or a clip, a resin tape, or the like similar to the fixtures 31 and 41 described above.

For example, in the wire harness 1, after the harness body 10 is inserted into the main body 51a of the fixture 51 in the second harness fixing structure 50, the first connector 21 is assembled to one terminal of the harness body 10. Then, in the wire harness 1, when the harness body 10 is temporarily held by the link mechanism 600, the fixing unit 51c of the fixture 51 is fixed to the bracket 621. In the wire harness 1, the fixture 51 is indirectly fixed to the slide door 500 by assembling the link mechanism 600 to the slide door 500, whereby the harness body 10 is fixed to the slide door 500 side. Subsequently, in the wire harness 1, the first connector 21 and the second connector 22 of the harness body 10 temporarily held by the link mechanism 600 are electrically connected to the first electrical connection target 550 side and the second electrical connection target 560 side. In the wire harness 1, the harness body 10 is fixed to the link mechanism 600 by the first harness fixing structure 40, and the harness body 10 is fixed to the vehicle body B side by the third harness fixing structure. In the wire harness 1, positions to which the harness body 10 is fixed to increase, and the harness body 10 can be assembled to the slide door 500 and the vehicle body B in the same process as the assembling process of the link mechanism 600 with respect to the slide door 500 and the vehicle body B, so that the assembling workability of the harness body 10 can be improved.

In the wire harness according to the present embodiment, a harness body is temporarily held by a link mechanism by a harness temporary holding structure before the link mechanism is assembled to a slide door and a vehicle body, so that the harness body can be assembled to the slide door and the vehicle body together with the link mechanism. As described above, in the wire harness, the harness body can be assembled to the slide door and the vehicle body in the same process as the process of assembling the link mechanism to the slide door and the vehicle body. Therefore, the wire harness can improve the assembling workability of the harness body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
   a harness body that is a wiring component that electrically connects a first electrical connection target installed on a slide door and a second electrical connection target installed on a vehicle body, and is wired along a link mechanism that couples the slide door and the vehicle body and reciprocates the slide door in a sliding direction with respect to the vehicle body;
   a harness temporary holding structure at least at one temporary holding position, configured to temporarily holding the harness body assembled to the link mechanism and allow a relative displacement between the harness body and the link mechanism at the temporary holding position before the link mechanism is assembled to the slide door and the vehicle body,
   a harness fixing structure assembled to the link mechanism at least at one position different from the temporary holding position for fixing the harness body to the link mechanism, and
   a route regulating unit wired along the link mechanism between the harness temporary holding structure and harness fixing structure, and configured to keep the wiring route of the harness body at a constant position with respect to the slide door regardless of the sliding position of the slide door.

2. The wire harness according to claim 1, wherein
   the harness temporary holding structure is used as a fixing structure for fixing the harness body to the link mechanism after the link mechanism is assembled to the slide door and the vehicle body.

3. The wire harness according to claim 2, wherein
   the harness body is provided as a pair with the one link mechanism.

4. The wire harness according to claim 1, wherein
   the harness body is provided as a pair with the one link mechanism.

5. The wire harness according to claim 4, further comprising:
   a plurality of link mechanisms including the one link mechanism, and
   the harness body wired in pairs with at least one of the plurality of link mechanisms.

6. The wire harness according to claim 3, further comprising:
   a plurality of link mechanisms including the one link mechanism, and
   the harness body wired in pairs with at least one of the plurality of link mechanisms.

* * * * *